United States Patent
Lin et al.

(10) Patent No.: US 10,471,524 B2
(45) Date of Patent: Nov. 12, 2019

(54) COLLAPSIBLE SLIDE MITER SAW

(71) Applicant: REXON INDUSTRIAL CORP., LTD., Taichung (TW)

(72) Inventors: Ju Zhen Lin, Taichung (TW); Ya Pin Kuo, Taichung (TW); Hung Jung Chiang, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 0 days.

(21) Appl. No.: 15/773,868

(22) PCT Filed: Nov. 16, 2016

(86) PCT No.: PCT/US2016/062156
§ 371 (c)(1),
(2) Date: May 4, 2018

(87) PCT Pub. No.: WO2017/087447
PCT Pub. Date: May 26, 2017

(65) Prior Publication Data
US 2019/0111503 A1    Apr. 18, 2019

Related U.S. Application Data

(60) Provisional application No. 62/255,694, filed on Nov. 16, 2015.

(30) Foreign Application Priority Data

Nov. 6, 2015  (TW) .............................. 104137658 A

(51) Int. Cl.
*B23D 45/04*    (2006.01)
*B23D 47/02*    (2006.01)

(52) U.S. Cl.
CPC ........... *B23D 45/048* (2013.01); *B23D 47/02* (2013.01)

(58) Field of Classification Search
CPC .............................. B23D 45/048; B23D 47/02
See application file for complete search history.

(56) References Cited

U.S. PATENT DOCUMENTS

| 5,957,021 A * | 9/1999 | Meredith | B23D 45/048 83/397 |
|---|---|---|---|
| 9,016,179 B2 | 4/2015 | Chiu | |
| 2001/0042429 A1* | 11/2001 | Brunson | B23D 45/048 83/471.3 |
| 2003/0088986 A1 | 5/2003 | Ushiwata et al. | |

(Continued)

FOREIGN PATENT DOCUMENTS

WO    WO2014150859 A1    9/2014

*Primary Examiner* — Sean M Michalski
(74) *Attorney, Agent, or Firm* — Bacon & Thomas, PLLC

(57) ABSTRACT

A foldable miter saw includes a base unit, a worktable, and a cutting unit adjustable between a working position where the saw blade of the cutting unit and the worktable define a contained angle within 90°~45° and a folded position where one end face of the saw blade is disposed in proximity to the working surface and one guiding member and one sliding coupling component of the worktable are disposed in proximity to a working surface of the worktable, significantly reducing the dimension of the foldable miter saw and facilitating storage and packaging.

10 Claims, 10 Drawing Sheets

(56) References Cited

U.S. PATENT DOCUMENTS

| | | | |
|---|---|---|---|
| 2003/0221531 A1* | 12/2003 | Anthony | B23D 45/044 83/581 |
| 2009/0007742 A1 | 1/2009 | Nie et al. | |
| 2009/0107316 A1* | 4/2009 | Thomas | B23D 45/048 83/471.3 |
| 2009/0224454 A1 | 9/2009 | Liu et al. | |
| 2011/0107892 A1 | 5/2011 | Imamura et al. | |
| 2011/0314989 A1 | 12/2011 | Xu | |
| 2012/0017736 A1* | 1/2012 | Thomas | B23D 45/048 83/471.2 |
| 2012/0118121 A1 | 5/2012 | Xie et al. | |
| 2013/0104717 A1* | 5/2013 | Rees | B23D 45/044 83/468.7 |
| 2015/0059548 A1* | 3/2015 | Kani | B23D 47/126 83/473 |
| 2017/0239737 A1* | 8/2017 | Lin | B23D 45/04 |
| 2018/0297132 A1* | 10/2018 | Xu | B27B 5/165 |

* cited by examiner

COLLAPSIBLE SLIDE MITER SAW

BACKGROUND OF THE INVENTION

1. Field of the Invention

The present invention relates to processing machinery, and more particularly, to a foldable miter saw.

2. Description of the Related Art

A conventional miter saw (Taiwan Patent 2013225776) comprises a base unit, a worktable rotatable relative to the base unit, a cutting unit connected to the worktable at one lateral side, and a positioning unit. The base unit comprises a bottom frame, and two foot stands respectively and fixedly mounted at two opposite lateral sides of the bottom frame. The positioning unit comprises a screw rod threaded into the worktable. When adjusting the cutting angle of the cutting unit, the user must loosen the screw rod, and then operate the worktable to rotate the cutting unit relative to the base unit. After moving the cutting unit to the desired angle, the screw rod is tighten again to lock the cutting unit in position.

Further, in Taiwan Patent 201420239, by using a sector plate-shaped locking member and a positioning unit allows adjustment of the tilting angle of a saw blade of a cutting unit relative to a top wall of a worktable to achieve the desired cutting angle. The maximum tilting angle of the saw blade relative to the top wall of the worktable is 45°.

The aforesaid prior art miter saws allow adjustment of the cutting angle, however, when these prior art miter saws are temporarily not in use and to be stored, they occupy a large volume and require a large storage space. Further, when packaging the miter saws for delivery after fabrication, they require a large delivery space, increasing the delivery cost.

SUMMARY OF THE INVENTION

The present invention has been accomplished with these circumstances in view. It is the main object of the present invention to provide a foldable miter saw, which can be folded into a folded position to reduce the dimension and making it convenient for storage and delivery.

To achieve this and other objects of the present invention, a foldable miter saw comprises a base unit, a worktable and a cutting unit. The base unit comprises a front edge, a rear edge opposite to the front edge, a first side edge between the front edge and the rear edge, a second side edge opposite to the first side edge, a bottom wall extended from the front edge to the rear edge, and a top wall opposite to the bottom wall.

The worktable is rotatably mounted on the base unit, comprising a turntable, an axle holder facing toward the rear edge and connected to the turntable, and an extension member facing toward the front edge and connected to the turntable. The turntable defines a working surface opposite to the bottom wall and corresponding to the top wall. The axle holder defines an axis in parallel to the working surface and extending from the rear edge toward the front edge.

The cutting unit comprises a support base pivotally connected to the axle holder of the worktable and rotatable relative to the base unit and the worktable, a sliding member slidably coupled to the support base, a cantilever pivotally connected to the sliding member, a saw blade mounted at the cantilever, and a driver mounted at the cantilever and adapted for driving the saw blade to rotate. The support base comprises at least one guiding member for allowing the sliding member to slide thereon.

The sliding member comprises at least one sliding coupling component coupled to and slidable along the guiding member, the cutting unit being turnable about the axis relative to the base unit and the worktable, and allowing the worktable and the cutting unit to be folded between a working position where the saw blade of the cutting unit defines with the worktable a predetermined contained angle within 90°~45° angle, and a folded position where an end face of the saw blade of the cutting unit is disposed in proximity to the working surface; the guiding member and the sliding coupling component are disposed in proximity to the working surface.

The invention has the effect of: utilizing the design that the cutting unit is biasable relative to the base unit and the worktable, the cutting unit can be folded from the working position to the folded position to significantly reduce the dimension of the foldable miter saw, facilitating storage and delivery, saving packing and delivery costs.

Other and further benefits, advantages and features of the present invention will be understood by reference to the following specification in conjunction with the accompanying drawings, in which like reference characters denote like elements of structure.

DETAILED DESCRIPTION OF THE INVENTION

Figure 1:
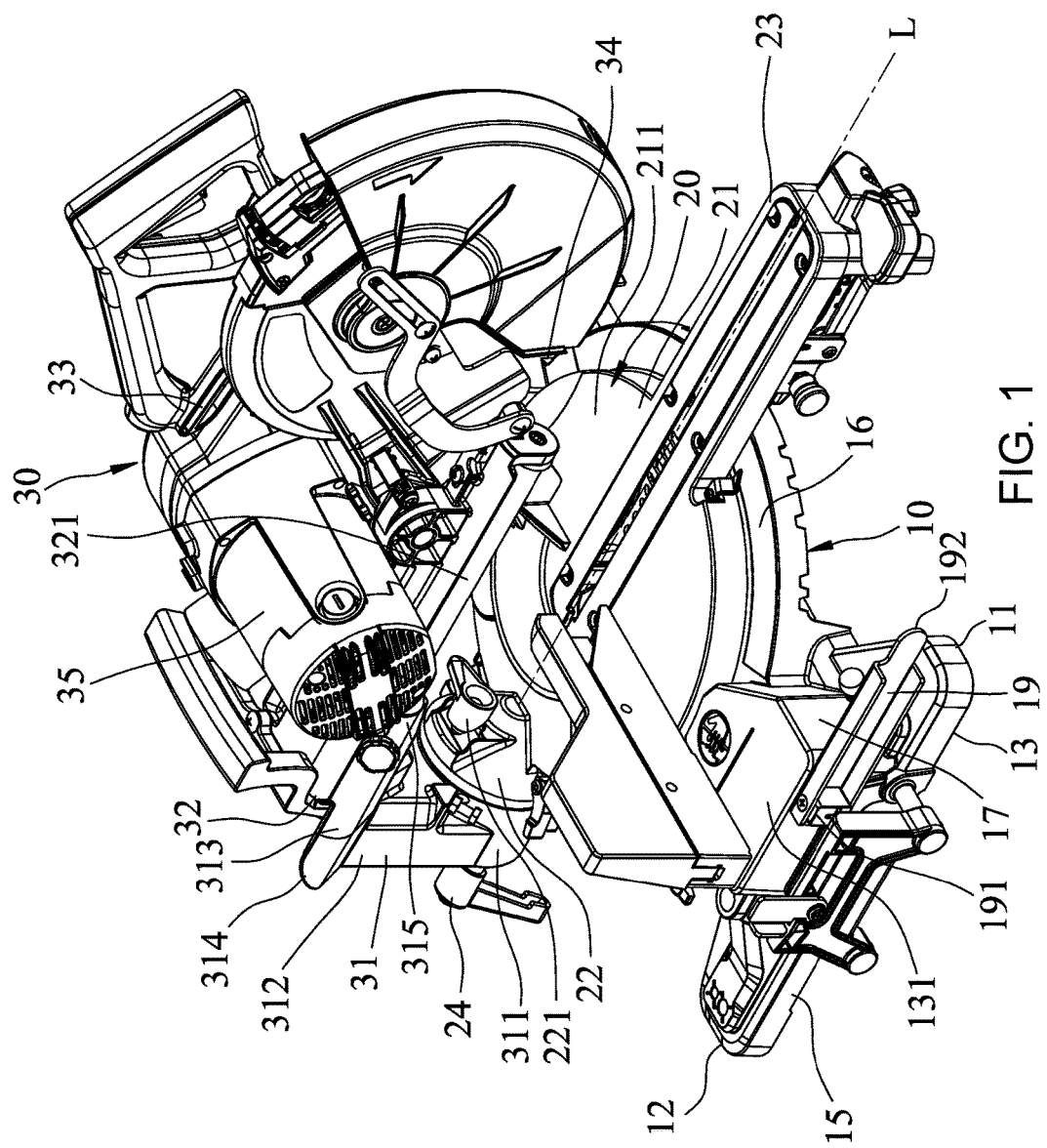
FIG. 1 is an oblique top elevational view of a foldable miter saw in a working position in accordance with the present invention.
Figure 2:
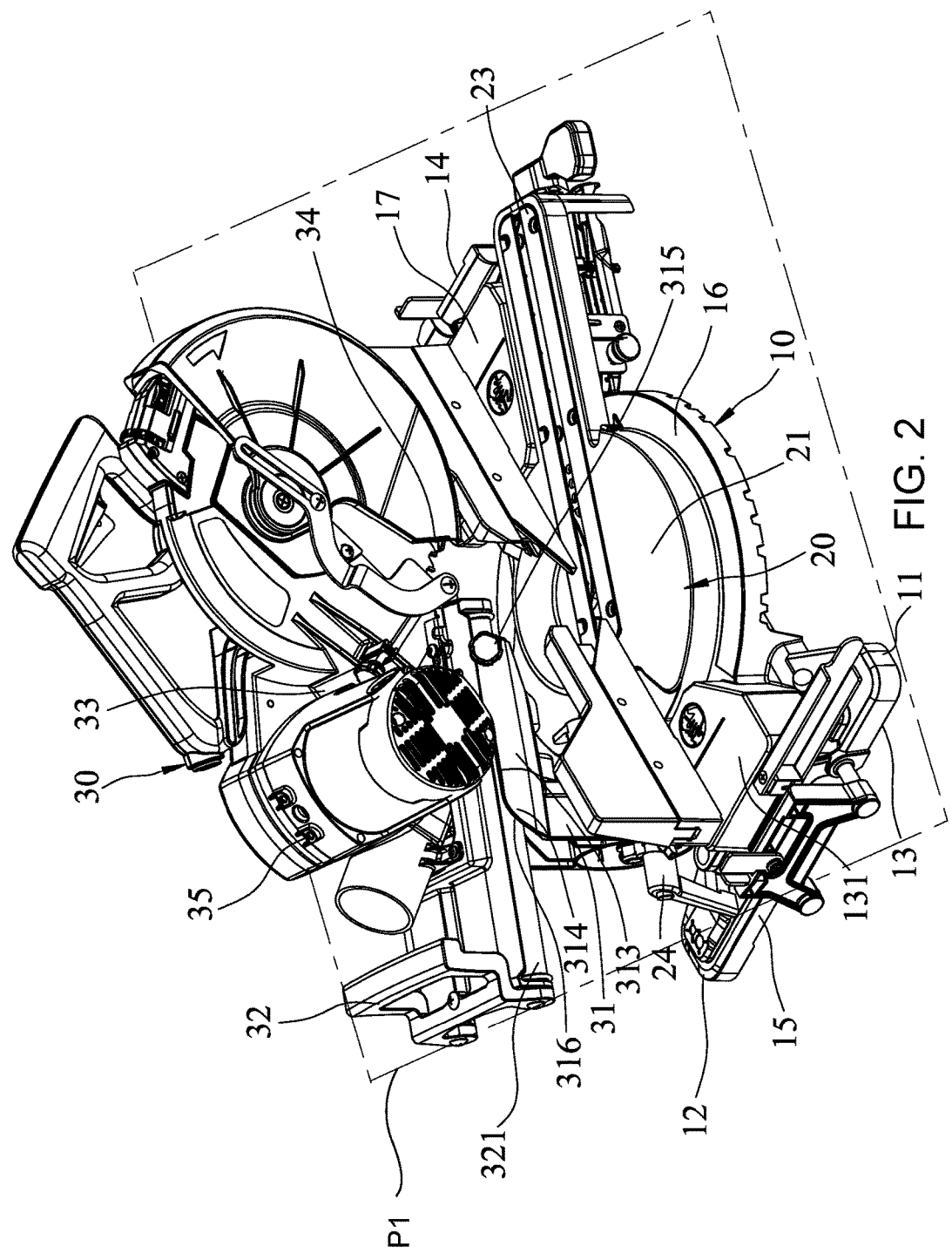
FIG. 2 is another oblique top elevational view of the present invention, illustrating the foldable miter saw in an oblique cutting position.

Referring to FIGS. 1 and 2, a foldable miter saw in accordance with the present invention is shown. The foldable miter saw comprises a base unit 10, a worktable 20, a cutting unit 30, and a safety switch unit 40 (see FIGS. 8, 9 and 10).

The base unit 10 comprises a front edge 11, a rear edge 12 disposed opposite to the front edge 11, a bottom wall 13 extended from the front edge 11 to the rear edge 12, a top wall 131 disposed opposite to the bottom wall 13, a first side edge 14 (FIG. 2) connected between the front edge 11 and the rear edge 12, and a second side edge 15 disposed opposite to the first side edge 14.

Structurally, the base unit 10 comprises a disk-like bottom frame 16, two foot stand holders 17 respectively and horizontally connected to two opposite lateral sides of the disk-like bottom frame 16. Further, the front edge 11 and the rear edge 12 each are respectively formed by the disk-like bottom frame 16 and the foot stand holders 17 (The peripheries of the disk like bottom frame 16 and the foot stand holders 17 formed the front edge 11 and the rear edge 12). The first side edge 14 and the second side edge 15 are respectively formed on the foot stand holders 17 at an outer side. The top wall 131 is formed on the foot stand holders 17 at a top side.

Figure 4:
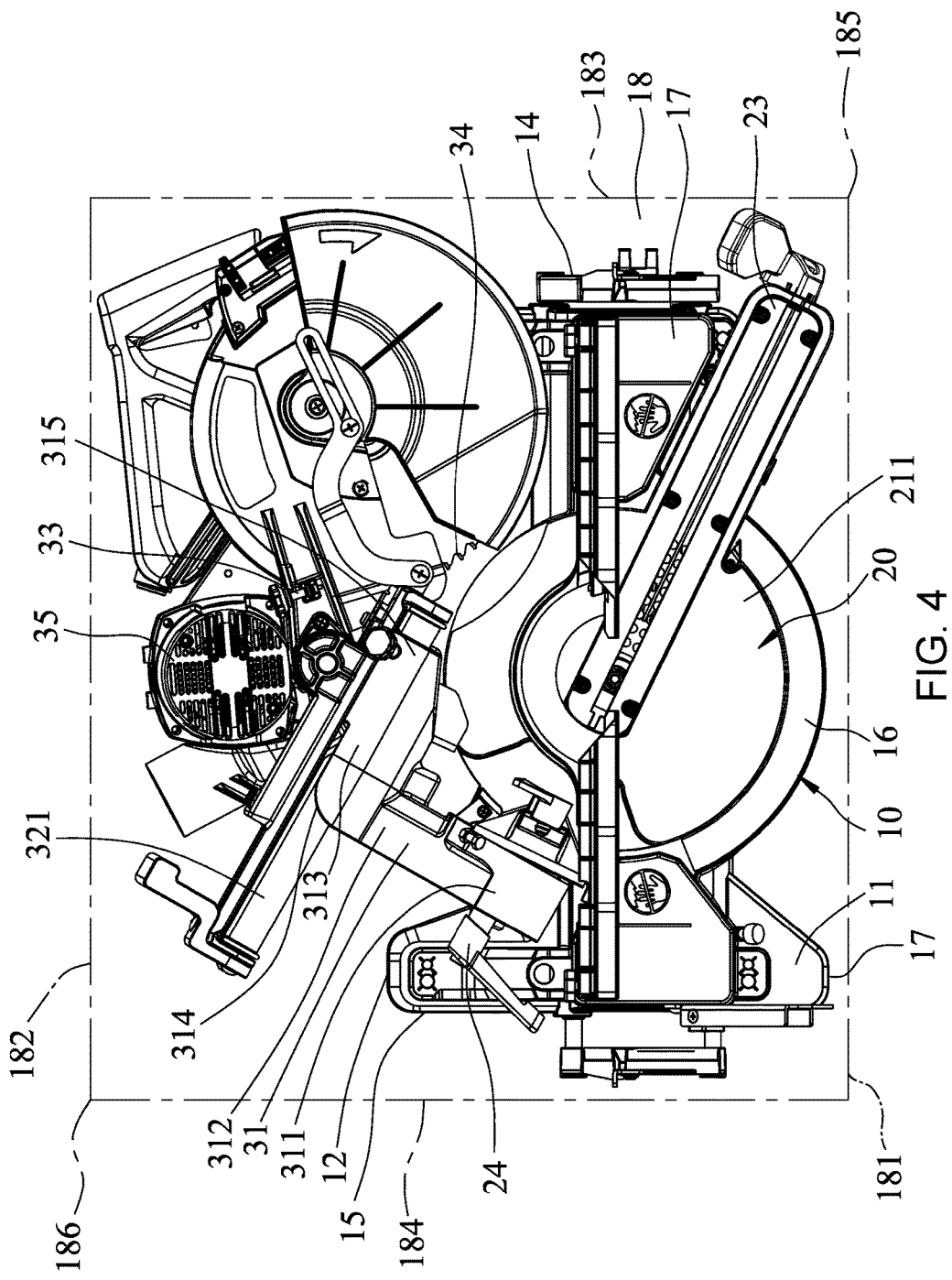
FIG. 4 is a top view of the present invention, illustrating the foldable miter saw in the folded position.
Figure 5:
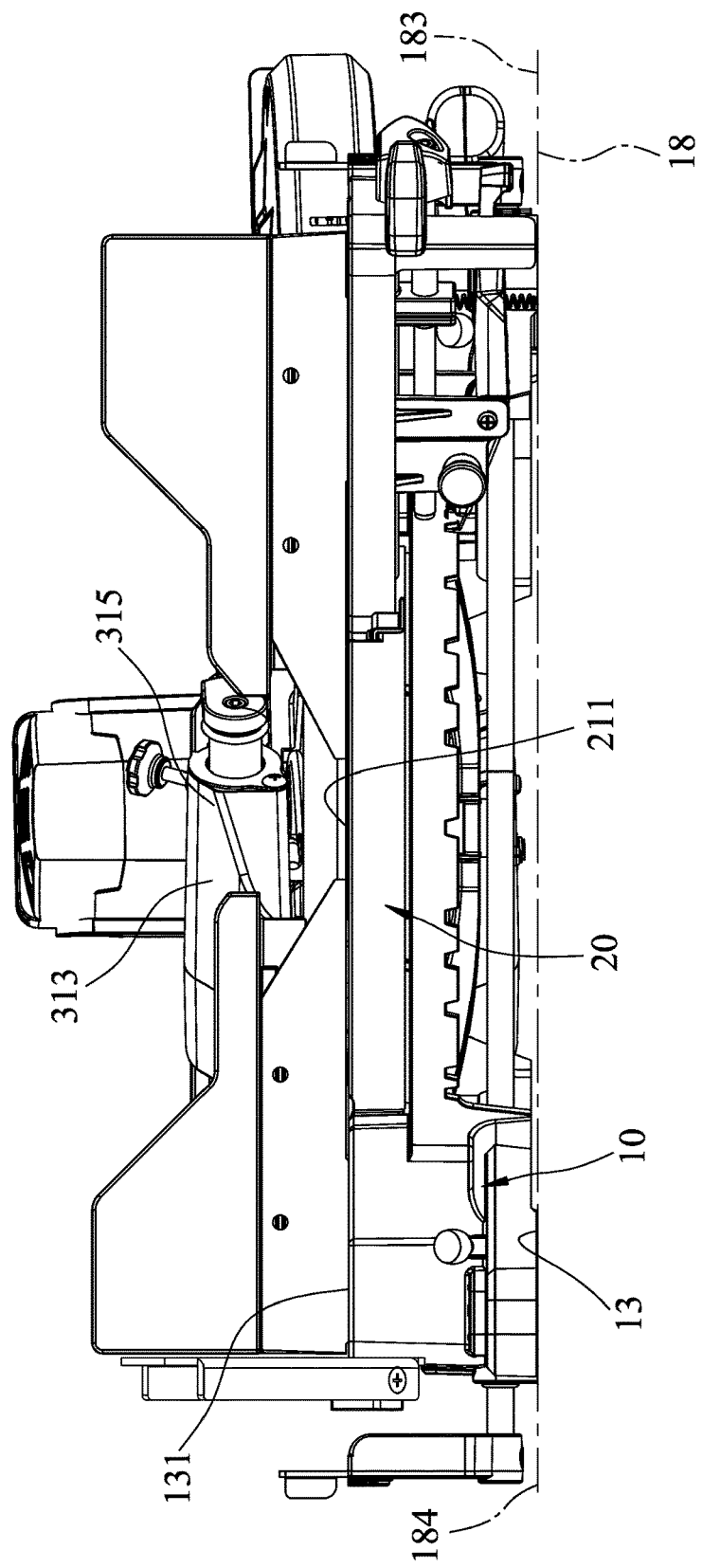
FIG. 5 is a schematic front view of the present invention, illustrating the foldable miter saw in the folded position.

Referring also to FIG. 4, a rectangular reference plane 18 is formed in parallel to the bottom wall 13. The rectangular reference plane 18 has a first side 181 corresponding to the front edge 11, a second side 182 corresponding to the rear edge 12, a third side 183 corresponding to the first side edge 14, a fourth side 184 corresponding to the second side edge 15, a first corner 185 at the connection between the first side 181 and the third side 183, and a second corner 186 at the connection between the second side 182 and the fourth side 184 and opposite to the first corner 185.

The base unit 10 further comprises a foot stand 19 (FIG. 1) pivotally connected to one foot stand holder 17. The foot stand 19 comprises a pivot-connection end 191 located at one end thereof and pivotally connected to the foot stand holder 17, and a bearing end 192 located at an opposite end which is distal from the pivot-connection end 191. The foot stand 19 is foldable between a collapsed position in proximity to the bottom wall 11 (see FIGS. 1 and 2), and a supporting position far from the bottom wall 11 (see the imaginary line in FIG. 3 and FIG. 7).

The worktable 20 is rotatably mounted on a top wall of the disk-like bottom frame 16 of the base unit 10, comprising a turntable 21, an axle holder 22 (FIG. 1) facing toward the rear edge 12 and connected to the turntable 21, an extension member 23 facing toward the front edge 11 and connected to the turntable 21, and a positioning member 24 connected to the axle holder 22 fastened to the cutting unit 30. The turntable 21 defines a working surface 211 opposite to the bottom wall 13 and corresponding to the top wall 131. The axle holder 22 comprises an axis L extending from the rear edge 12 toward the front edge 11 in a parallel manner relative to the working surface 211, and an operable locking pin 221.

The cutting unit 30 comprises a support base 31 pivotally coupled to the axle holder 22 of the worktable 20 and biasable relative to the base unit 10 and the worktable 20, a sliding member 32 coupled to and slidable along the support base 31, a cantilever 33 pivotally connected to the sliding member 32, a saw blade 34 mounted at the cantilever 33 and having left and right end faces disposed in parallel, and a driver 35 mounted at the cantilever 33 and adapted for driving the saw blade 34 to rotate. In this embodiment, the driver 35 is motor coupled with the saw blade 34 by a belt transmission mechanism. The center of gravity of the motor is located at the side of the left end face of the saw blade 34, as shown in FIG. 1.

The support base 31 comprises a pivot-connection portion 311 pivotally connected to the axle holder 22, a connection portion 312 connected to the pivot-connection portion 311, and a guiding member 313 for enabling the sliding member 32 to slide thereon. The guiding member 313 is connected to the connection portion 312 opposite to the pivot-connection portion 311. The guiding member 313 comprising an outer end 314 corresponding to the pivot-connection portion 311, an inner end 315 opposite to the outer end 314 and constantly suspended above the working surface 211, and a pair of sliding grooves 316 (FIG. 2) extended from the outer end 314 to the inner end 315. Operating the positioning member 24 can lock the pivot-connection portion 311 to the axle holder 22, or bias the pivot-connection portion 311 relative to the axle holder 22.

The sliding member 32 comprises a pair of sliding coupling components 321 slidable relative to the guiding member 313. In this embodiment, the sliding coupling components 321 are round rods respectively slidably coupled to the sliding grooves 316. The sliding coupling components 321 defines a connection plane P1 (FIG. 2) that is substantially perpendicular to the two end faces of the saw blade 34. The saw blade 34 is disposed between the two coupling components 321.

Figure 8:
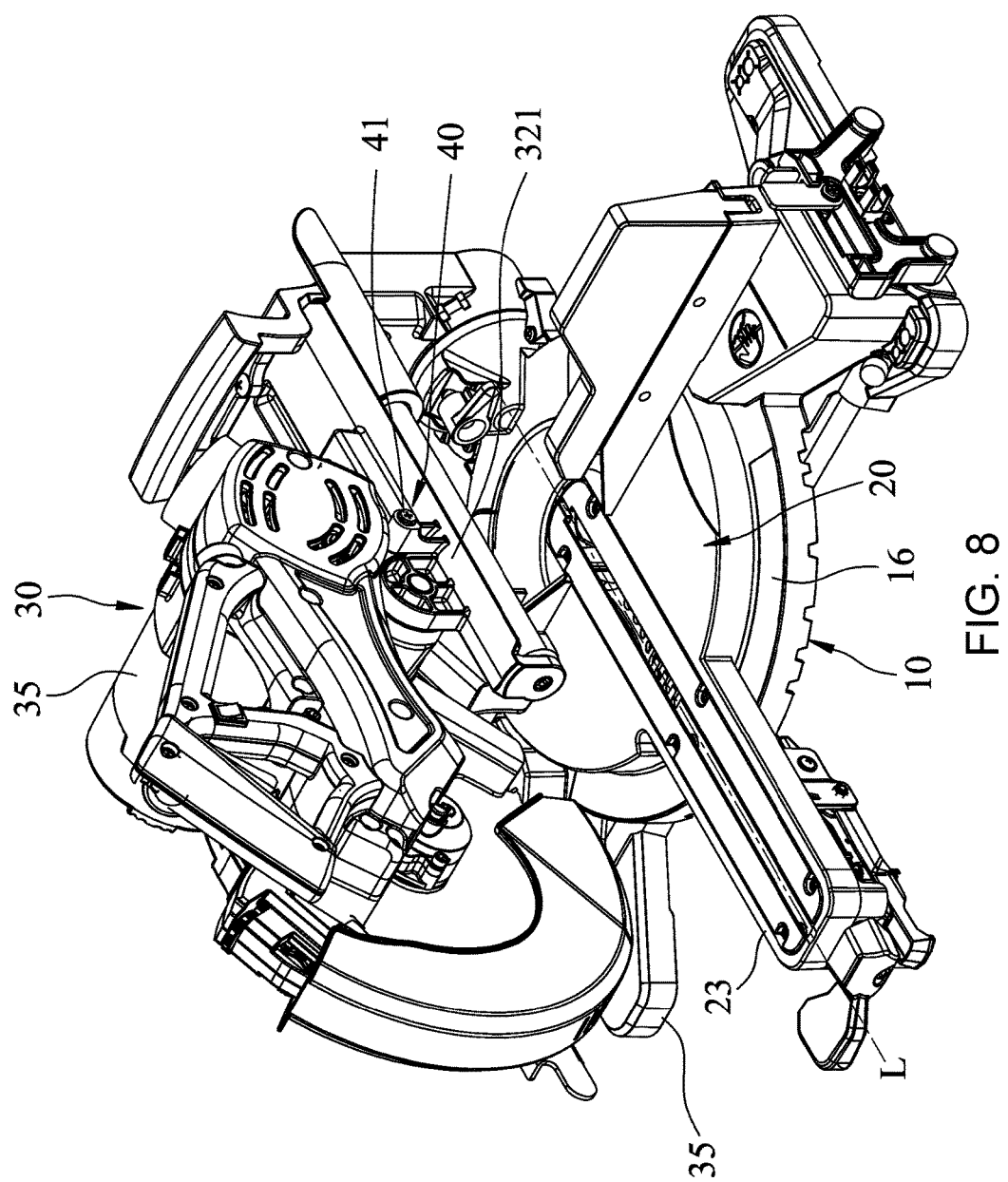
FIG. 8 is an oblique rear elevational view of the foldable miter saw in accordance with the present invention.
Figure 9:
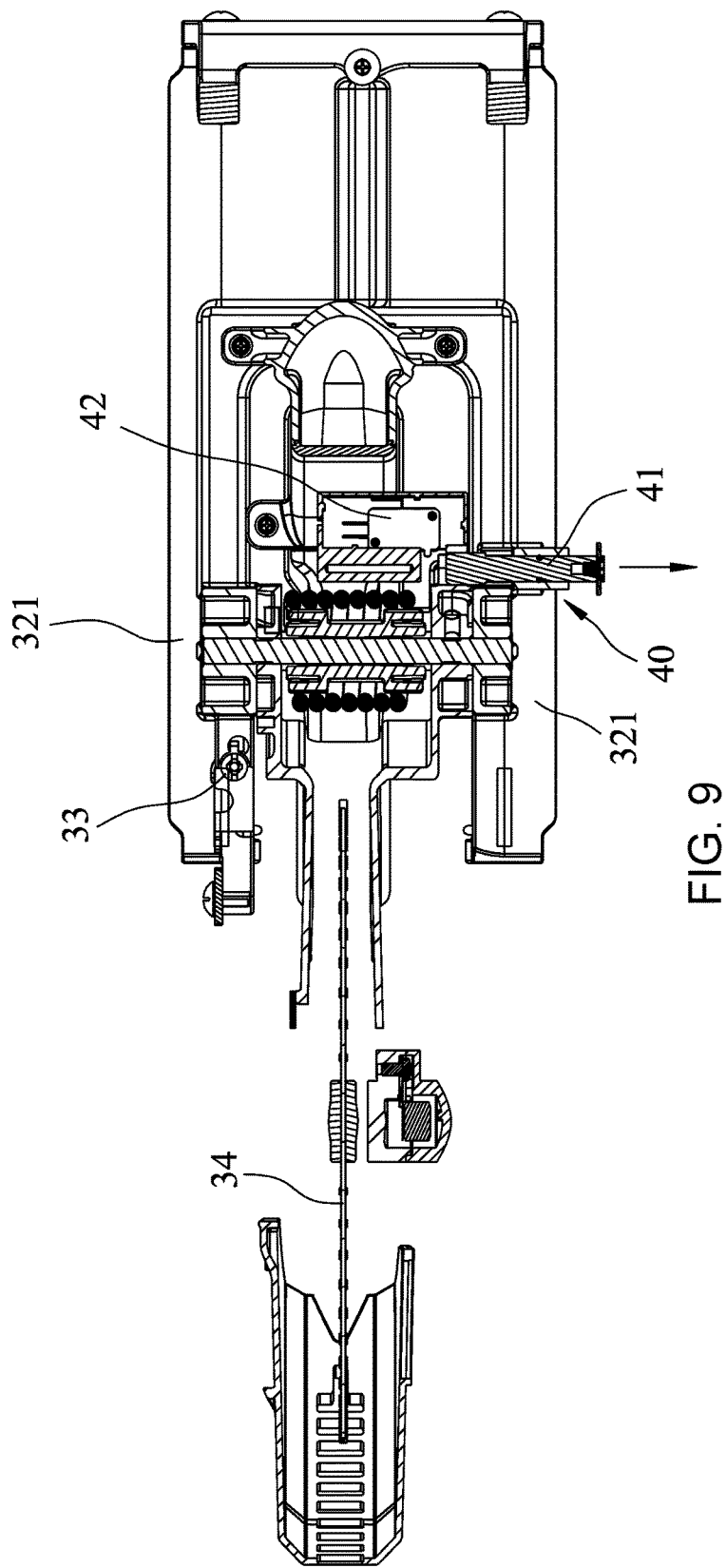
FIG. 9 is a sectional view of a part of the present invention, illustrating the safety switch unit in the open position.
Figure 10:
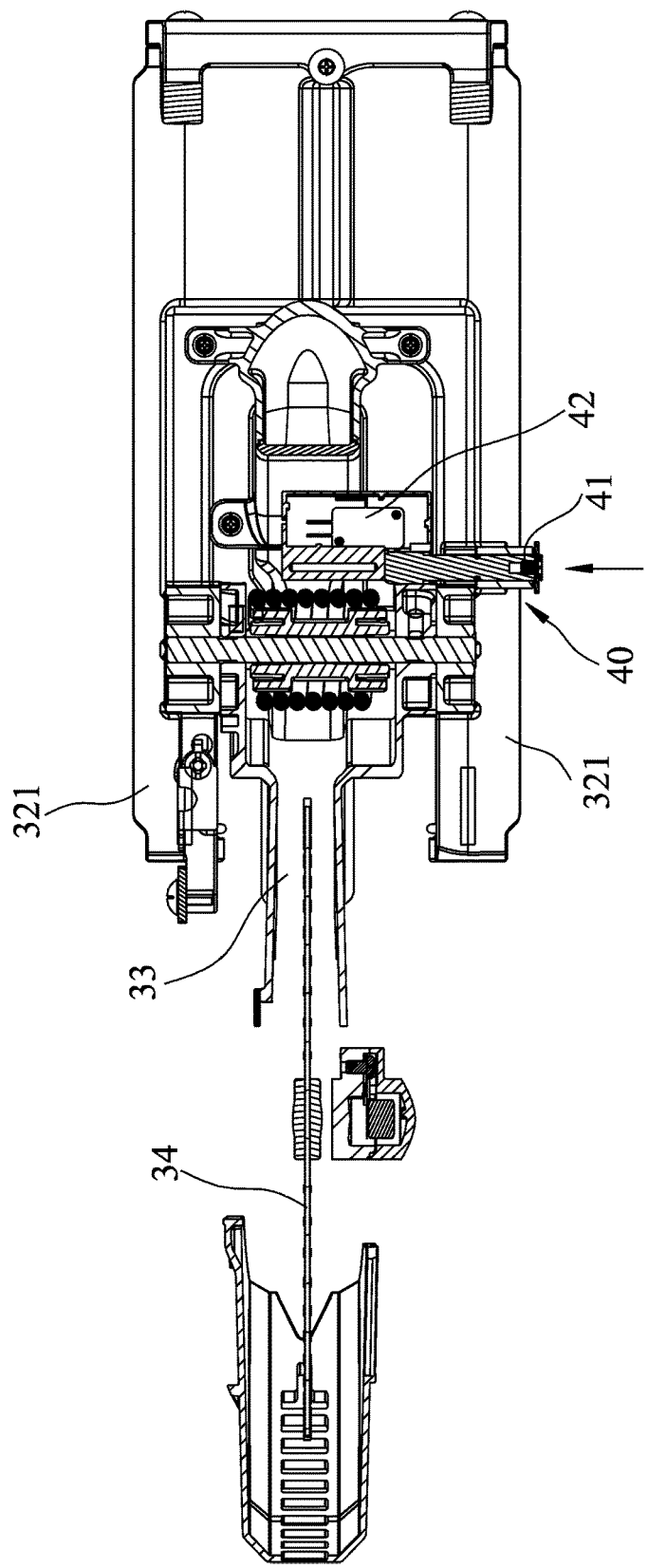
FIG. 10 corresponds to FIG. 9, illustrating the safety switch unit in the close position.

Referring also to FIGS. 8 and 9, the safety switch unit 40 comprises a safety pin 41 mounted at a top side of the sliding coupling components 321, and a safety switch 42 mounted at the cantilever 33.

As illustrated in FIG. 1, when the adjustable miter saw is set in the working position, the driver 35 is suspended above the working surface 211 of the worktable 20. After placing the workpiece to be cut on the working surface 211, the user can move the sliding member 32, cantilever 33, saw blade 34 and driver 35 of the cutting unit 30 relative to the support base 31 in a direction parallel to the axis L, and then drive the cantilever 33 to bias the saw blade 34 downwardly relative to the sliding member 32 to cut the workpiece vertically.

If the operator operates the extension member 23 of the worktable 20 to bias the cutting unit 30 relative to the base unit 10 during the cutting operation, the cutting unit 30 can be driven to perform a miter cut.

If the operator loosens the positioning member 24 and turns the whole assembly of the cutting unit 30 about the axis L relative to the worktable 20 through a predetermined angle to have a predetermined contained angle be defined between the saw blade 34 and the working surface 211, the foldable miter saw can be operated to perform bevel cuts.

If the foldable miter saw is temporarily not in use and needs to be stored or packed for delivery, the operator can operate the cantilever 33 to bias the saw blade 34 toward the sliding coupling components 321, and then press the safety pin 41 toward the inside of the cantilever 33 to trigger the safety switch 42 (see FIG. 10), thereby cutting off power supply from the driver 35. At this time, the safety pin 41 is located in the off position, for ensuring operational safety. Further, as illustrated in FIG. 2, the operator can operate the cutting unit 30 to move the sliding member 32, the cantilever 33, the saw blade 34 and the driver 35 relative to the support base 31 to the direction where the saw blade 34 is disposed in proximity to the guiding member 313, and then rotate the worktable 20 and the cutting unit 30 relative to the base unit 10 in the counter-clockwise direction shown in FIG. 2 to the extent, and then loosen the positioning member 24 and turn the pivot-connection portion 311 of the cutting unit 30 about the axis L relative to the axle holder 22 to the position where one end face of the saw blade 34 is disposed in proximity to the working surface 211, converting the cutting unit 30 into the folded position (see FIG. 3). At this time, the contained angle between one end face of the saw blade 34 and the working surface 211 is within 10°~0° angle where one end face of the saw blade 34 is substantially disposed in parallel to the working surface 211 and also in proximity to the working surface 211 and, the center of gravity of the driver 35 is located at one side of the other end face of the saw blade 34.

Figure 6:
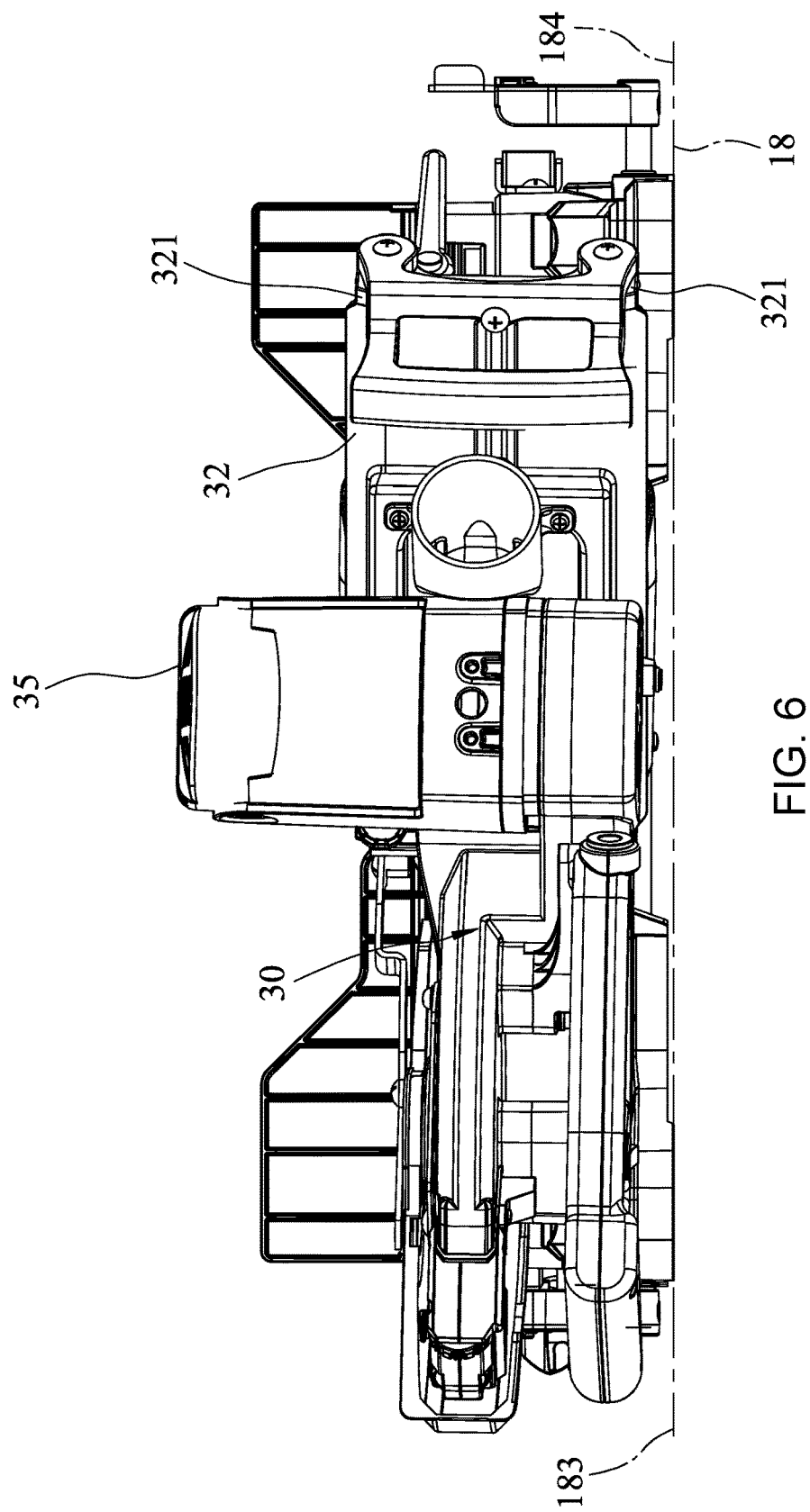
FIG. 6 is a schematic rear view of the present invention, illustrating the foldable miter saw in the folded position.

As illustrated in FIGS. 3-6, when the cutting unit 30 is in the folded position, the distal end of the extension member 23 is disposed in proximity to (and pointing toward) the first corner 185; the guiding member 313 and the sliding coupling components 321 are disposed in proximity to the rectangular reference plane 18; the inner end 315 of the guiding member 313 is disposed in proximity to the working surface 21; one sliding coupling component 321 is located between the working surface 211 and the bottom wall 13 (see FIG. 6); the distal ends of the sliding coupling component 321 are disposed in proximity to the second corner 186. Therefore, after folding up the foldable miter saw, the distal end of the extension member 23 is disposed in proximity to the first corner 185 and the distal ends of the sliding coupling components 321 are disposed in proximity to the second corner 186, thus, as shown in FIG. 4, the width between the first side 181 and the second side 182 is significantly reduced compared to that in the working position, the length between the third side 183 and the fourth side 184 is also significantly reduced compared to that in the working position. Further, as shown in FIG. 6, because one sliding coupling component 321 is disposed between the working surface 211 and the bottom wall 13 at this time, the height between the bottom wall 13 and the opposite side is also significantly reduced. Therefore, when the foldable miter saw is folded up, the dimension of the foldable miter saw is significantly reduced for packaging, saving on the delivery cost.

When wishing to convert the foldable miter saw from the folded position to the working position, move the cutting unit 30 to the position shown in FIG. 1 and FIG. 8, and then operate the cantilever 33 to bias the saw blade 34 relative to the sliding coupling component 321 in direction away from the sliding coupling component 321, and then pull (retract) the safety pin 41 from the off position to the on position (see FIG. 9). When the safety pin 41 reaches the on position, it is kept far from the safety switch 42, and the driver 35 is electrically connected.

Figure 3:
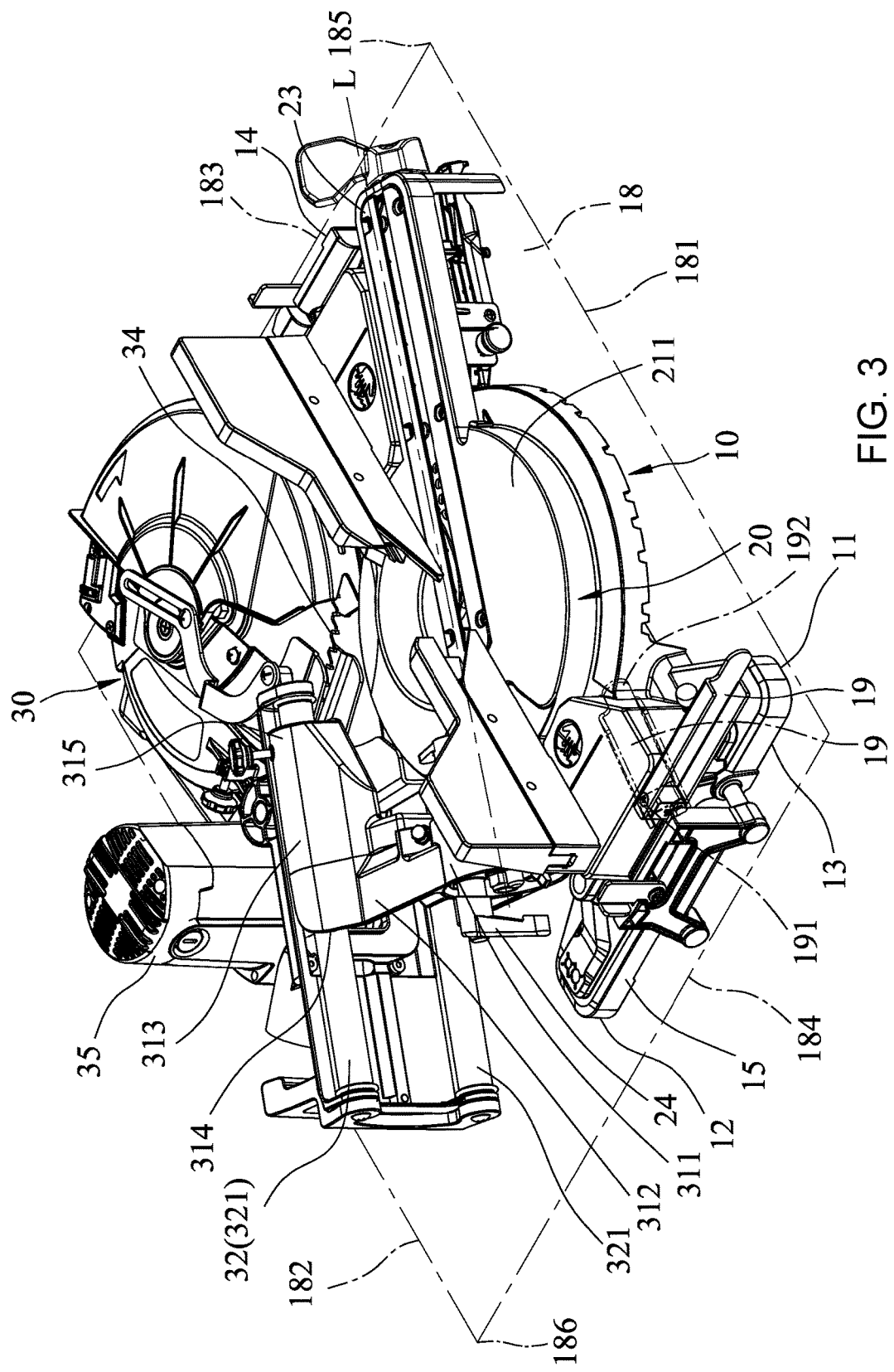
FIG. 3 is a schematic drawing of the present invention, illustrating the foldable miter saw in a folded position.
Figure 7:
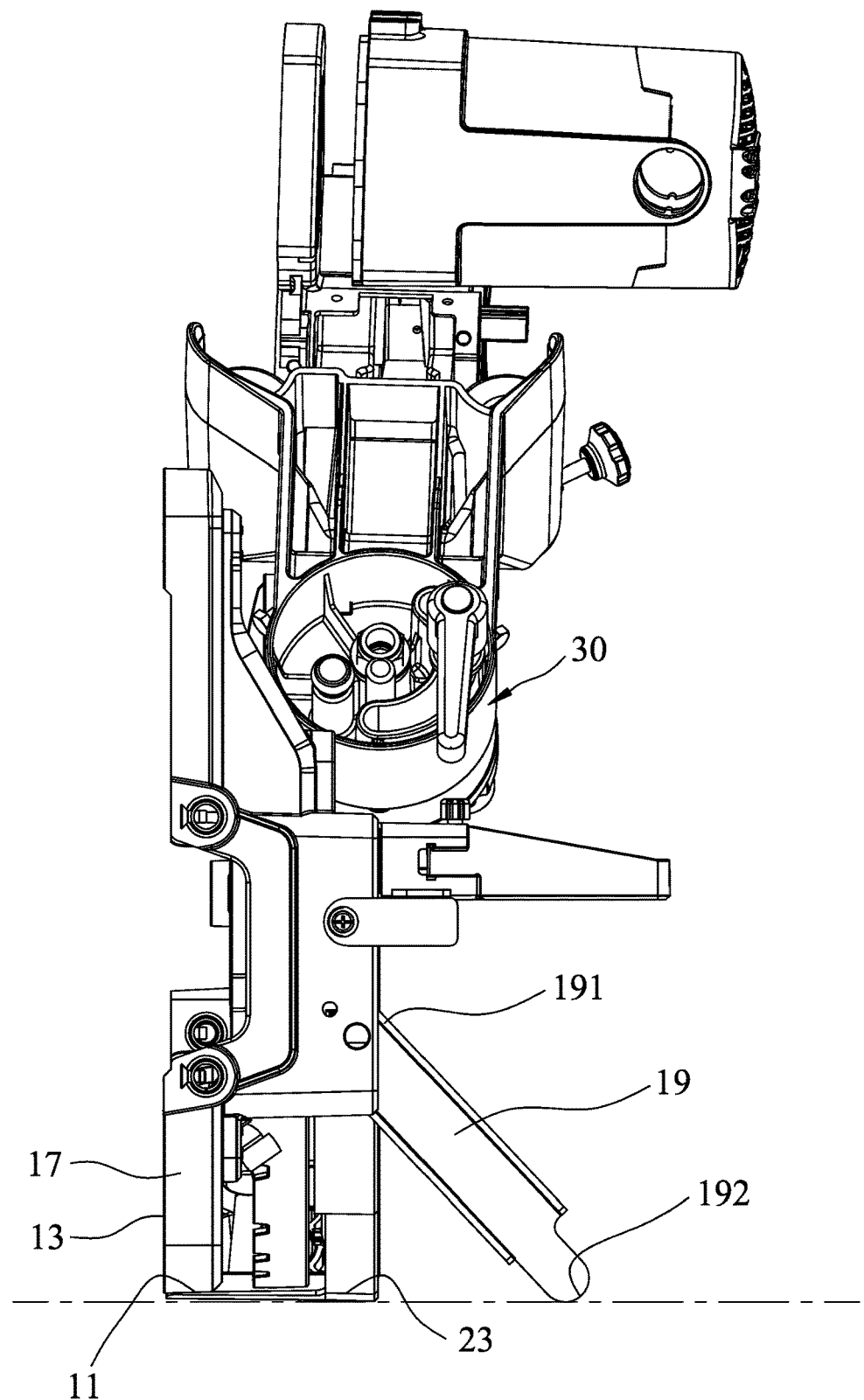
FIG. 7 is a schematic drawing of the present invention, illustrating the foldable miter saw set in the folded position and erected on the floor.

Further, as shown in the imaginary line in FIG. 3 and FIG. 7, when the cutting unit 30 is set in the folded position, the front edge 11 of one foot stand holder 17, the bearing end 192 of the foot stand 19 and the distal end 412 of the extension member 23 can be positioned on the floor to support the foldable miter saw in a standing position (upright configuration) steadily in a 3-point support manner, minimizing storage space occupation.

In conclusion, the foldable miter saw of the present invention can be conveniently set between a working position for cutting operation and a folded position for storage or delivery with minimized space occupation to save delivery cost.

Although a particular embodiment of the invention has been described in detail for purposes of illustration, various modifications and enhancements may be made without departing from the spirit and scope of the invention.

What is claimed is:

1. A foldable miter saw, comprising:
    a base unit comprising a front edge, a rear edge opposite to said front edge, a first side edge between said front edge and said rear edge, a second side edge opposite to said first side edge, a bottom wall extended from said front edge to said rear edge, and a top wall opposite to said bottom wall;
    a worktable rotatably mounted on said base unit, said worktable comprising a turntable, an axle holder facing toward said rear edge and connected to said turntable and an extension member facing toward said front edge and connected to said turntable, said turntable defining a working surface opposite to said bottom wall and corresponding to said top wall, said axle holder defining an axis in parallel to said working surface and extending from said rear edge toward said front edge; and
    a cutting unit comprising a support base pivotally connected to said axle holder of said worktable and rotatable relative to said base unit and said worktable, a sliding member slidably coupled to said support base, a cantilever pivotally connected to said sliding member, a saw blade mounted at said cantilever and a driver mounted at said cantilever and adapted for driving said saw blade to rotate, said support base comprising at least one guiding member for allowing said sliding member to slide thereon, said sliding member comprising at least one sliding coupling component coupled to and slidable along said guiding member,
    said cutting unit being turnable about said axis relative to said base unit and said worktable and allowing said worktable and said cutting unit to be folded between a working position where said saw blade of said cutting unit defines with said worktable a predetermined contained angle within 90°~45° and a folded position where an end face of said saw blade of said cutting unit is disposed in proximity to said working surface and said guiding member and said sliding coupling component are disposed in proximity to said working surface.

2. The foldable miter saw as claimed in claim 1, wherein said support base of said cutting unit further comprises a connection portion connected to said pivot-connection portion; said guiding member is connected to said connection portion opposite to said pivot-connection portion, comprising an outer end facing toward said pivot-connection portion and an inner end opposite to said outer end and suspending above said working surface; when said cutting unit is set in said folded position, said inner end of said guiding member is disposed in proximity to said working surface.

3. The foldable miter saw as claimed in claim 2, wherein said guiding member of said support base of said cutting unit comprises at least one sliding groove; said sliding coupling component of said sliding member is shaped like a round rod and slidably coupled to one respective said sliding groove.

4. The foldable miter saw as claimed in claim 3, wherein there are two sliding grooves of said guiding member of said cutting unit; there are two sliding coupling components of said sliding member; when said cutting unit is set in said folded position, one said sliding coupling component of said cutting unit is disposed between said working surface and said bottom wall.

5. The foldable miter saw as claimed in claim 4, wherein said saw blade of said cutting unit is disposed between the two said sliding coupling components of said sliding member.

6. The foldable miter saw as claimed in claim 2, further comprising a safety switch unit, said safety switch unit comprising a safety pin mounted at a top side of said at least one sliding coupling component and a safety switch mounted in said cantilever, wherein when said cantilever is operated to bias said saw blade relative to said at least one sliding coupling component to a position where said saw blade is disposed in proximity to said at least one sliding coupling component, said safety pin is movable from an open position to a close position; when said safety pin is set in said close position, said safety pin triggers said safety switch to cut off power supply from said driver; when said cantilever is operated to bias said saw blade relative to said at least one sliding coupling component to a position where said saw blade is disposed far from said at least one sliding coupling component, said safety pin is moved from said close position to said open position and disposed far from said safety switch, enabling said safety switch to conduct power supply to said driver.

7. The foldable miter saw as claimed in claim 1, wherein said base unit further comprises a disk-like bottom frame, two foot stand holders horizontally connected to two opposite sides of said disk-like bottom frame and a foot stand pivotally connected to one said foot stand holder, said foot stand comprising a pivot-connection end located at one end thereof and pivotally connected to one said foot stand holder and a bearing end located at an opposite end thereof opposite to said pivot-connection end, said foot stand being foldable between a collapsed position in proximity to said bottom wall and a supporting position far from said bottom wall.

8. The foldable miter saw as claimed in claim 1, wherein when said end face of said saw blade of said cutting unit is disposed in proximity to said working surface, said saw blade and said working surface define a contained angle within 10°~0°.

9. The foldable miter saw as claimed in claim 1, wherein said driver is a motor; when said cutting unit is set in said folded position, one end face of said saw blade of said cutting unit is disposed in proximity to said working surface, and the center of gravity of said saw blade is located at one side of an opposite end face of said saw blade.

10. The foldable miter saw as claimed in claim 1, wherein the axis is centrally located with respect to the axle holder.

* * * * *